(12) United States Patent
Minor et al.

(10) Patent No.: US 7,259,350 B2
(45) Date of Patent: Aug. 21, 2007

(54) TURBINE COMPONENT CRACK REPAIR USING CATHODIC ARC AND/OR LOW PRESSURE PLASMA SPRAYING AND HIP

(75) Inventors: Michael Minor, Arlington, TX (US); Chris Bischof, Southlake, TX (US); Herbert Koven, Southlake, TX (US); Paul Pellet, Arlington, TX (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 10/926,772

(22) Filed: Aug. 26, 2004

(65) Prior Publication Data

US 2006/0049236 A1    Mar. 9, 2006

(51) Int. Cl.
*B23K 10/00* (2006.01)
(52) U.S. Cl. ............... 219/121.47; 219/121.59; 219/76.16; 219/121.46
(58) Field of Classification Search ........... 219/121.47, 219/121.59, 121.48, 121.45, 121.46, 76.15, 219/76.16
See application file for complete search history.

(56) References Cited

U.S. PATENT DOCUMENTS

| 3,802,938 | A | | 4/1974 | Collins et al. |
|---|---|---|---|---|
| 4,098,450 | A | | 7/1978 | Keller et al. |
| 4,482,398 | A | | 11/1984 | Eylon et al. |
| 5,318,217 | A | * | 6/1994 | Stinson et al. ............... 228/194 |
| 5,732,467 | A | * | 3/1998 | White et al. ............... 29/889.1 |
| 6,136,453 | A | | 10/2000 | Ritter et al. |
| 6,575,349 | B2 | * | 6/2003 | Van Esch ............... 228/119 |
| 6,629,368 | B2 | * | 10/2003 | Schnell et al. ............. 29/889.1 |
| 6,659,332 | B2 | * | 12/2003 | Smashey et al. ............ 228/119 |
| 2002/0076573 | A1 | * | 6/2002 | Neal et al. ................... 428/621 |
| 2003/0211356 | A1 | | 11/2003 | Beers et al. |
| 2004/0084423 | A1 | * | 5/2004 | Grossklaus et al. ..... 219/121.45 |
| 2005/0005733 | A1 | | 1/2005 | Okada et al. |
| 2005/0015980 | A1 | * | 1/2005 | Kottilingam et al. .. 29/888.011 |
| 2005/0106315 | A1 | * | 5/2005 | Rigney et al. .............. 427/140 |

* cited by examiner

*Primary Examiner*—Mark Paschall
(74) *Attorney, Agent, or Firm*—Bachman & LaPointe, P.C.

(57) ABSTRACT

A method for repairing cracks in a metal part comprising the steps of providing a metal part having a crack, cleaning the crack to remove an oxide layer, depositing a repair alloy via at least one of cathodic arc deposition and low pressure plasma spraying to cover the crack, and heating the part at a temperature and pressure sufficient to close the crack.

30 Claims, 2 Drawing Sheets

TURBINE COMPONENT CRACK REPAIR USING CATHODIC ARC AND/OR LOW PRESSURE PLASMA SPRAYING AND HIP

BACKGROUND OF THE INVENTION (1) Field of the Invention

The invention relates to a method for repairing cracks in metal parts using cathodic arc coating and Hot Isostatic Pressing processes.

(2) Description of the Related Art

It is common for gas turbine engine components to develop, over the course of their operation, cracks that originate on the surface of the component and extend into the component or vice versa. Such cracks primarily arise over time from the extreme temperatures and pressures experienced by the turbine engine components. Of particular concern are cracks which form in turbine components comprised of superalloy materials such as nickel-based superalloys. Such materials tend to produce equiaxed, directionally solidified, and single crystal alloy structures.

Unfortunately, presently utilized methods for repairing such cracks suffer from significant drawbacks. Examples of such presently employed methods include Activated Diffusion Healing (ADH) or Turbofix™ diffusion brazing, welding, and the use of High Velocity Oxy-Fuel (HVOF) spray materials. ADH/Turbofix diffusion brazing typically employs a mixture of braze and base alloy to seal the crack. Properties of the braze and base alloy typically exhibit less than 50% of the strength of the base material on equiaxed alloys. When applied to directionally solidified and single grain alloys, the braze and base alloy repair material exhibits strength properties which are significantly lower than 50% of base material. Attempts to weld base material into cracks suffer from different drawbacks. Specifically, it is difficult to apply through a process of welding a material onto a superalloy component without inducing further cracking, typically due to the localized heat input from the welding operation. In addition, in instances where the weld is successful, the properties exhibited by directionally solidified and single crystal alloys exhibit significantly lower strength than the original part. Lastly, the application of HVOF spray materials similarly suffers drawbacks. Specifically, because the process seals the cracks in an air atmosphere, the ability to seal and bond the crack is inhibited as a result of the presence of oxidation. Moreover, HVOF processes induce oxidation in both the material being applied, and the part to which the material is being applied. The internal oxidation of the part and the oxygen content of the applied alloy lessens the resulting strength of the repair.

What is therefore needed is a method for repairing cracks in metallic parts, particularly gas turbine engine components, which can seal and repair the crack with an alloy resulting in a repair exhibiting material properties which approach that of the base material from which the part is constructed, and which is usable on an equiaxed, directionally solidified and single crystal alloys.

SUMMARY OF THE INVENTION

Accordingly, it is an object of the present invention to provide a method for repairing cracks in metal parts using cathodic arc coating and Hot Isostatic Pressing processes.

In accordance with the present invention, a method for repairing cracks in a metal part comprises the steps of providing a metal part having a crack, cleaning the crack to remove an oxide layer, depositing a repair alloy via at least one of cathodic arc deposition and low pressure plasma spraying to cover the crack, and heating the part at a temperature and pressure sufficient to close the crack.

In further accordance with the present invention, a method for repairing cracks in a gas turbine engine component comprises the steps of providing a gas turbine engine component having a crack, cleaning the crack to remove an oxide layer, depositing a repair alloy via at least one of cathodic arc deposition and low pressure plasma spraying to cover the crack, and heating the gas turbine engine component at a temperature and pressure sufficient to close the crack.

In further accordance with the present invention, a repaired metal part made according to the process comprises the steps of providing a metal part having a crack to be repaired, cleaning the crack to remove an oxide layer, depositing a repair alloy via at least one of cathodic arc deposition and low pressure plasma spraying to cover the crack, and heating the part at a temperature and pressure sufficient to close and repair the crack.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

It is therefore a teaching of the present invention to provide a method of repairing metallic parts, and particularly gas turbine engine components, by applying metal alloy and metal superalloys of a material similar to or even superior to the base material to which it is applied, in terms of cycle fatigue strength and improved oxidation, using cathodic arc coating and/or low pressure plasma spraying (LPPS) and hot isostatic pressing processes.

Figure 1:
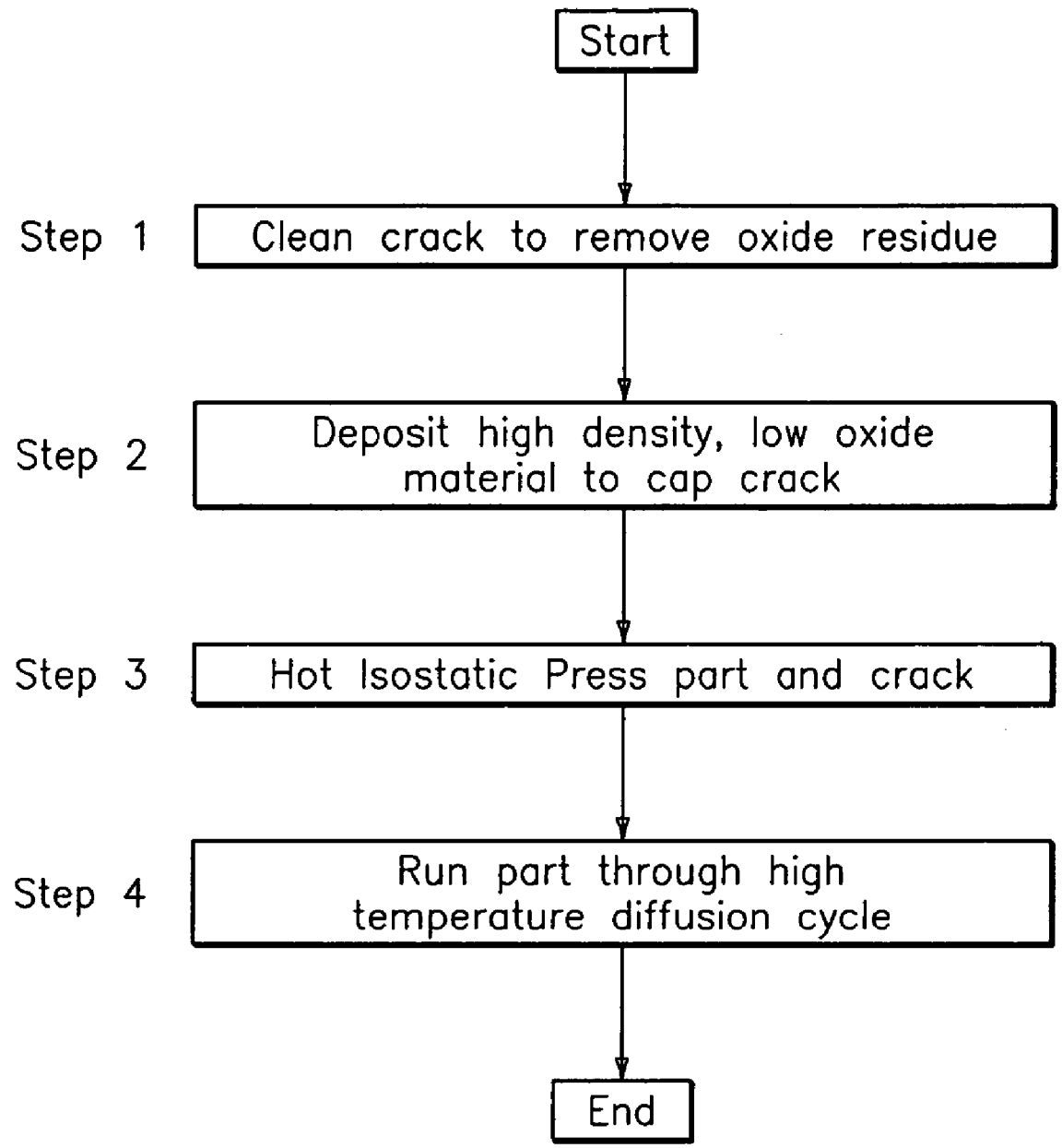
FIG. 1 is a flow diagram of the method of the present invention.

With reference to FIG. 1, there is provided a flowchart showing the steps of the method of the present invention. In step 1, the part is cleaned to remove undesirable substances such as engine run contaminants and oxide. During operation, gas turbine engine components, particularly, fan and compressor blades, experience elevated temperatures. Operating at such high temperatures in an atmosphere comprising oxygen results in the formation of an oxide layer on the surface of the part and the interior walls of any crack which may form. Were such an engine run oxide layer not removed prior to repair, the oxide layer would tend to act as a diffusion barrier and prevent the bonding of repair material to the walls of the crack to be repaired and would prevent the substrate material not coated with repair material from bonding with itself during HIP and later heat treat as is described more fully below. The present invention employs a gas comprising hydrogen in order to remove the engine run oxide. Preferably, a hydrogen fluoride gas is introduced into contact with the part surface and, in particular, the walls of the crack to be repaired. As oxide layer thicknesses vary from part to part, the parameters for removing the oxide are expressed as an amount of hydrogen fluoride gas in contact with the part for a time sufficient to reduce or eliminate the engine run oxide layer on at least the crack walls.

Figure 2:
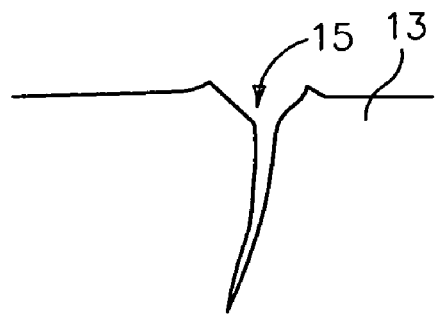
FIG. 2 is a diagram of a crack to be repaired using the method of the present invention.
Figure 3:
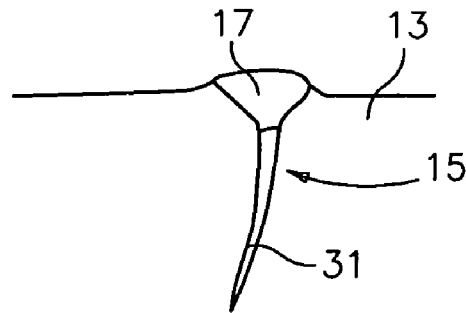
FIG. 3 is a diagram illustrating the part after application of the repair material in accordance with the present invention.

Next, in step 2, a high density, low oxide material is applied via a cathodic arc and/or a LPPS coating process to the crack. With reference to FIG. 2, there is illustrated a typical crack profile. Crack 15 opens to a surface of metal part 13 and extends downwards into metal part 13. One will note that the geometry of crack 15 is such that a relatively wide portion of crack 15 opens to the surface of metal part 13, while a portion of crack 15 narrows substantially as it extends away from the opening of crack 15. The narrowness of such a portion of crack 15 reduces the ability to deposit, via a cathodic arc or LPPS deposition process, the high density, low oxide material forming repair alloy 17 as is illustrated with reference to FIG. 3. Repair alloy 17 serves to seal, or cap, crack 15 leaving a narrow, empty volume of space of crack 15 extending down and away from repair alloy 17. For reasons which will be described more fully below, it is important that this empty portion of crack 15 which is not filled by repair alloy 17 be substantially void of air or other fluid. For this reason, the cathodic arc or LPPS coating process used to deposit repair alloy 17 within crack 15 is performed in a vacuum or near vacuum (less than about $10^{-2}$ Torr) environment.

In a preferred embodiment, repair alloy 17 comprises a metal which closely matches the base alloy from which part 13 is constructed. By "closely matches" it is meant that the repair alloy is formed of a composition similar to or the same as the parent material from which part 13 is fabricated. Examples of such a metal used to form repair alloy 17 include, but are not limited to, nickel-based alloys, nickel-based superalloys, titanium, and titanium-based alloys. Most preferred with parts fabricated from nickel-based superalloys is the use of nickel-based superalloys as the repair alloy. As noted above, repair alloy 17 is preferably deposited as a high density, low oxide alloy material. By this it is meant that the repair alloy as deposited is preferably less than 1% oxide by volume (low oxide) and less than 1% porous by volume (high density).

Figure 4:
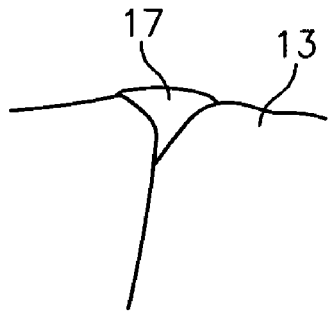
FIG. 4 is a diagram of a crack being repaired, after application of a Hot Isostatic Pressing step.

After depositing repair alloy 17 into crack 15 by a cathodic arc coating process in a vacuum or near vacuum environment, the metal part is subjected to a relatively high temperature, high pressure operation, preferably a hot isostatic press operation (step 3 in FIG. 4). Typically hot isostatic pressing is performed in an atmosphere of argon. In instances wherein the metal part containing the crack is comprised of a nickel-based alloy or nickel-based superalloy, the hot isostatic pressing is preferably performed at a pressure of between approximately 15 and 30 ksi at a emperature of between approximately 2,000° F. and 2,300° F. In instances in which the metal part is constructed of titanium or a titanium-based alloy, the hot isostatic pressing preferably takes place at a pressure of between approximately 15 and 30 ksi at a temperature less than 1,800° F. Preferably, the hot isostatic pressing in all cases is performed for a minimum of two hours regardless of the part or repair alloy composition.

Hot isostatic pressing serves to heat the part under substantial pressure containing the crack 15 in which repair alloy 17 has been deposited so as to expand internal structures resulting in the compression of hollow spaces and substructures such as the portion of the crack 15 into which no repair alloy 17 was deposited. As a result, post hot isostatic pressing, the repaired crack 15 appears as shown with reference to FIG. 4. Note that, as a result of the hot isostatic press, the portion of the crack forming a hollow space 31 in FIG. 3 has been closed/sealed.

Figure 5:
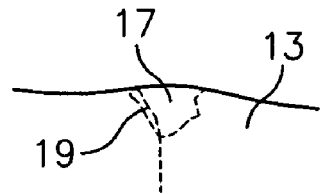
FIG. 5 is a diagram of a repaired crack illustrating the diffusion region after a heat treatment step.

In an alternative embodiment, after cathodic arc coating of the crack and application of a hot isostatic pressing operation, the part may be run through a high temperature diffusion cycle as shown in step 4. A diffusion cycle serves to correct changes in the physical properties of the part arising from the hot isostatic pressing followed by a relatively slow cooling process. After heating a part through a process of hot isostatic pressing, the part 13 is typically cooled slowly, e.g., at a rate of approximately 10° F. per minute. In the case of Ni alloy parts, such a slow cooling rate typically results in gamma prime coarsening and causes the part to exhibit diminished properties, e.g., structural strength, compared to properties prior to the hot isostatic press condition. High temperature diffusion for nickel alloy parts involves heating the part to between 1800° F. and 2300° F. in a vacuum furnace (less than or equal to approximately 1 Torr) and then cooling a part at a relatively rapid rate, e.g., at a rate of at least 35° F. per minute, preferably between 100° F. and 150° F. per minute. In addition to restoring the properties of the part 13, the high temperature diffusion cycle serves to diffuse the repair alloy 17 with the adjacent material forming the sidewalls of the crack 15. With reference to FIG. 5, there is illustrated a diffusion region 19 resulting from the application of such a diffusion cycle. It can be seen that repair alloy 17 is situated in the space originally occupied by crack 15. However, the edges of repair alloy 17, in contact with the walls of crack 15, have interdiffused with the adjacent base alloy to form diffusion region 19, which comprises of material which is a mixture of repair alloy 17 and the base alloy forming part 13.

As described above, the process of the present invention is equally applicable to components formed of equiaxed, directionally solidified, and single crystal alloys. Use of the process of the present invention does not disrupt the grain orientation of the alloy in which the crack is formed. As a result of depositing the repair alloy 17 and performing a hot isostatic pressing operation on the part, the interior surfaces of crack 15 are bonded together leaving an equiaxed, directionally solidified or single crystal grains as appropriate. As a result, in contrast to the presently used methods described above, the method of the present invention allows the deposition of a repair alloy material which approaches, and in some cases surpasses, the strength of the base material from which metal part 13 is formed. In addition, deposition of repair alloy 17 according to the process of the present invention does not induce cracking in metal part 13. Lastly, the repair alloy 17 deposited through the process of the present invention is greater than 99% dense and has a negligible oxide content of less than ~1%.

One or more embodiments of the present invention have been described. Nevertheless, it will be understood that various modifications may be made without departing from the spirit and scope of the invention. Accordingly, other embodiments are within the scope of the following claims.

What is claimed is:

1. A method for repairing cracks in a metal part comprising the steps of:

providing a metal part having a crack;

cleaning said crack to remove an oxide layer;

depositing a repair alloy via at least one of cathodic arc deposition and low pressure plasma spraying to cover said crack;

heating the part at a temperature and pressure sufficient to close the crack; and performing Hot Isostatic Pressing at a pressure between 15–30 ksi at a temperature between 2,000° F.–2,300° F. for at least two hours when said repair alloy comprises a metal selected from the group consisting of nickel-based alloys and nickel-based superalloys.

2. The method of claim 1, wherein said providing step comprises providing said crack in said surface of said metal part selected from the group consisting of air seals, turbine blades, fan blades, vanes and combustor panels.

3. The method of claim 1, wherein said providing step comprises providing said crack in said surface of said metal part comprising a metal selected from the group consisting of nickel-based alloys and nickel-based superalloys.

4. The method of claim 1, wherein said cleaning step comprises introducing a hydrogen fluoride gas into contact with said metal part forming said crack.

5. The method of claim 1, wherein said depositing step comprises the steps of:

creating a vacuum around at least said crack; and depositing said repair alloy selected from the group consisting of nickel-based alloys and nickel-based superalloys.

6. The method of claim 1, wherein said depositing step comprises depositing a repair alloy that contains less than 1% oxide by volume and less than 1% porosity by volume.

7. The method of claim 1, comprising the additional step of subjecting said metal part to a diffusion heat treatment cycle.

8. The method of claim 7, wherein said performing said diffusion heat treatment comprises performing said diffusion heat treatment at a temperature of between approximately 1800° F. and 2300° F. in a vacuum less than or equal to approximately 1 Torr.

9. A method for repairing cracks in a gas turbine engine component comprising the steps of:

providing a gas turbine engine component having a crack;

cleaning said crack to remove an oxide layer;

depositing a repair alloy via at least one of cathodic arc deposition and low pressure plasma spraying to cover said crack;

heating the gas turbine engine component at a temperature and pressure sufficient to close the crack; and performing Hot Isostatic Pressing at a pressure between 15–30 ksi at a temperature between 2,000° F. –2,300° F. for at least two hours when said repair alloy comprises a metal selected from the group consisting of nickel-based alloys and nickel-based superalloys.

10. The method of claim 9, wherein said providing step comprises providing said crack in said surface of said gas turbine engine component selected from the group consisting of air seals, turbine blades, fan blades, turbine vanes, combustor panels, cases, compressor blades and compressor vanes.

11. The method of claim 9, wherein said providing step comprises providing said crack in said surface of said gas turbine engine component comprising a metal selected from the group consisting of nickel-based alloys and nickel-based superalloys.

12. The method of claim 9, wherein said cleaning step comprises introducing a hydrogen fluoride gas into contact with at least the portion of said gas turbine engine component forming said crack.

13. The method of claim 9, wherein said depositing step comprises the steps of:

creating a vacuum around at least said crack; and depositing said repair alloy selected from the group consisting of nickel-based alloys, and nickel-based superalloys.

14. A repaired metal part made according to the process comprising the steps of:

providing a metal part having a crack to be repaired;

cleaning said crack to remove an oxide layer;

deposition and low pressure plasma spraying to cover said crack;

heating the part at a temperature and pressure sufficient to close and repair the crack; and performing Hot Isostatic Pressing at a pressure between 15–30 ksi at a temperature between 2,000° F. –2,300° F. for at least two hours when said repair alloy comprises a metal selected from the group consisting of nickel-based alloys and nickel-based superalloys.

15. The repaired metal part of claim 14, wherein said providing step comprises providing said crack in said surface of said metal part selected from the group consisting of air seals, turbine blades, fan blades, turbine vanes, combustor panels, cases, compressor blades, and compressor vanes.

16. A method for repairing cracks in a metal part comprising the steps of:

providing a metal part having a crack;

cleaning said crack to remove an oxide layer;

depositing a repair alloy via at least one of cathodic arc deposition and low pressure plasma spraying to cover said crack;

heating the part at a temperature and pressure sufficient to close the crack; and performing Hot Isostatic Pressing at a pressure between 15–30 ksi at a temperature<1,800° F. for at least two hours when said repair alloy comprises a metal selected from the group consisting of titanium and titanium-based alloys.

17. The method of claim 16, wherein said providing step comprises providing said crack in said surface of said metal part selected from the group consisting of air seals, turbine blades, fan blades, vanes and combustor panels.

18. The method of claim 16, wherein said providing step comprises providing said crack in said surface of said metal part comprising a metal selected from the group consisting of titanium and titanium-based alloys.

19. The method of claim 16, wherein said cleaning step comprises introducing a hydrogen fluoride gas into contact with said metal part forming said crack.

20. The method of claim 16, wherein said depositing step comprises the steps of:

creating a vacuum around at least said crack; and depositing said repair alloy selected from the group consisting of titanium and titanium-based alloys.

21. The method of claim 16, wherein said depositing step comprises depositing a repair alloy that contains less than 1% oxide by volume and less than 1% porosity by volume.

22. The method of claim 16, comprising the additional step of subjecting said metal part to a diffusion heat treatment cycle.

23. The method of claim 16, wherein said performing said diffusion heat treatment comprises performing said diffusion heat treatment at a temperature of between approximately 1800° F. and 2300° F. in a vacuum less than or equal to approximately 1 Torr.

24. A method for repairing cracks in a gas turbine engine component comprising the steps of:

providing a gas turbine engine component having a crack;
cleaning said crack to remove an oxide layer;
depositing a repair alloy via at least one of cathodic arc deposition and low pressure plasma spraying to cover said crack;
heating the gas turbine engine component at a temperature and pressure sufficient to close the crack; and
performing Hot Isostatic Pressing at a pressure between 15–30 ksi at a temperature<1,800° F. for at least two hours when said repair alloy comprises a metal selected from the group consisting of titanium and titanium-based alloys.

25. The method of claim 24, wherein said providing step comprises providing said crack in said surface of said gas turbine engine component selected from the group consisting of air seals, turbine blades, fan blades, turbine vanes, combustor panels, cases, compressor blades and compressor vanes.

26. The method of claim 24, wherein said providing step comprises providing said crack in said surface of said gas turbine engine component comprising a metal selected from the group consisting of titanium and titanium-based alloys.

27. The method of claim 24, wherein said cleaning step comprises introducing a hydrogen fluoride gas into contact with at least the portion of said gas turbine engine component forming said crack.

28. The method of claim 24, wherein said depositing step comprises the steps of:
creating a vacuum around at least said crack; and
depositing said repair alloy selected from the group consisting of titanium and titanium-based alloys.

29. A repaired metal part made according to the process comprising the steps of:
providing a metal part having a crack to be repaired;
cleaning said crack to remove an oxide layer;
deposition and low pressure plasma spraying to cover said crack;
heating the part at a temperature and pressure sufficient to close and repair the crack; and
performing Hot Isostatic Pressing at a pressure between 15–30 ksi at a temperature<1,800° F. for at least two hours when said repair alloy comprises a metal selected from the group consisting of titanium and titanium-based alloys.

30. The repaired metal part of claim 29, wherein said providing step comprises providing said crack in said surface of said metal part selected from the group consisting of air seals, turbine blades, fan blades, turbine vanes, combustor panels, cases, compressor blades, and compressor vanes.

* * * * *